United States Patent Office 3,031,721
Patented May 1, 1962

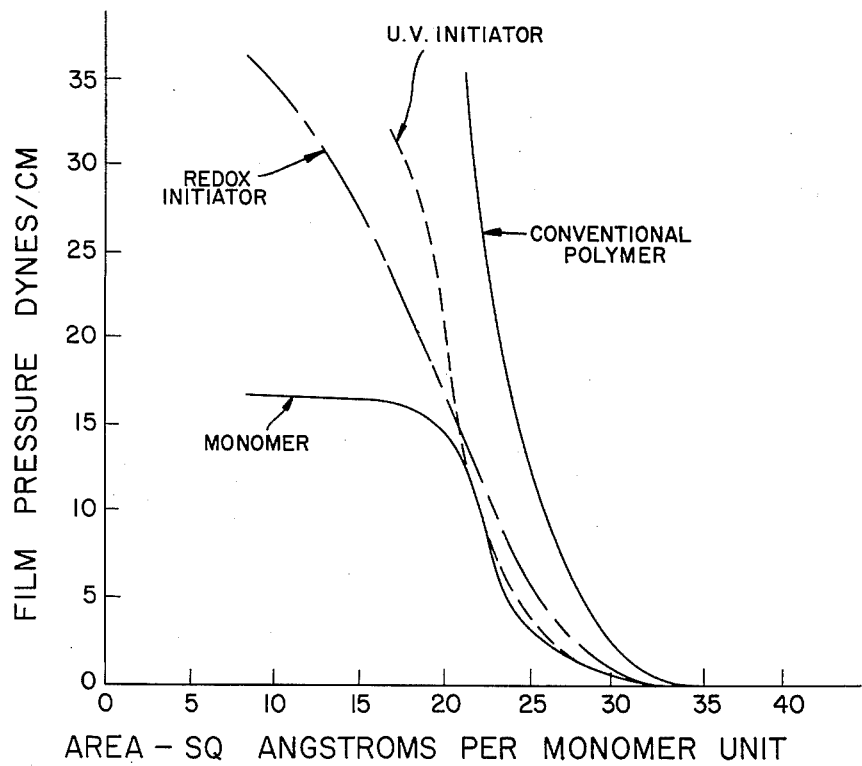

3,031,721
POLYMERIZATION PROCESS
Henry Z. Friedlander, Scarsdale, N.Y., assignor to American Cyanamid Company, New York, N.Y., a corporation of Maine
Filed Oct. 6, 1958, Ser. No. 765,312
4 Claims. (Cl. 18—57)

This invention relates to a novel method for the preparation of synthetic resinous compositions and more particularly to a method for making an oriented polymeric macromolecular monolayer or film substantially one molecule thick from water-insoluble, polymerizable vinyl esters.

Reference to the prior art discloses that although some work has been done in the past on monolayers and with force-area diagrams of monolayers, little has been done with macromolecular monolayers. Prior efforts with polymers in this field are reported by Müller, Z. Elektrochem 59, 312–329 (1955), and Schiebe and Schuller Zeit Elecktrochemic 59, 861 (1955). The latter dealing with polyethers is believed to be the first free radical polymerization of a monolayer.

To the best of my knowledge, no prior attempts have been successful in producing a film substantally one molecule thick by the polymerization of water-insoluble vinyl ester monomers. The procedure provided by the present invention may be advantageously adapted for various situations where conventional polymerization techniques are either unworkable or undesirable. For example, where the polymerization by conventional means is unduly slow; or where the product produced is high branched or cross-linked; or where the presence of higher temperature is undesirable.

In general, the procedure according to the invention comprises distributing a single layer of monomeric molecules at the interface of an aqueous medium with the aid of a water-immiscible organic solvent for the monomer and providing a source of free radicals to effect polymerization of the monomeric layer. It is believed that the soap-like, dipolar, long-chain compounds employed in the invention are highly oriented at the surface with their water attractive groups buried in the water and their water repelling hydrocarbon chains protruding above the surface. The sparse concentration of monomer molecules in the system enhances the opportunity for orientation of these molecules. When the monolayer is compressed and polymerized, the molecular structure obtained is one of ordered arrangement of the type characteristic of crystallinity. The polymers prepared according to the method of the invention are useful for various applications such as fiber formation, in ore or froth flotation applications, as aids in electron microscopy practice, in the synthesis of isotactic polymers, to prevent evaporation of lakes, for use in mineral dressing, and as lubricants, among other applications.

An object of the present invention is to provide a process for making an oriented polymer film substantially one molecule thick from water-insoluble vinyl esters. Other objects and advantages will be apparent to those skilled in the art as the description of the invention proceeds.

The formation of polymer film may be ascertained by the change in surface pressure over that when no polymer is present. In the present work, a Central Scientific Company Hydrophil Balance was employed in verifying the formation of polymer. In essence, the procedure utilized is as follows: a small quantity of monomer is dissolved in a non-aqueous solvent for the monomer and the solution so prepared is spread on the surface of water. The monomolecular monomeric layer is then compressed with a barrier over a measured distance, i.e. to provide a force-area value; the pressure exerted as the molecules are compressed is measured and plotted against area. When the layer is compressed near its highest pressure (but before crumbling), then polymerization is induced by generating free radicals U.V. light catalysts, etc.

The behavior of the product is then examined against a conventionally prepared polymer (of the same monomeric compound) which has been dispersed on a surface, compressed and measured in a like manner. The force-area diagram of polymer made by the film method of the invention is compared with monomer and polymer (from the same monomer) made by conventional methods. Upon a comparison, if the force-area diagram of the experimental reaction product corresponds to the diagram for authentic polymer rather than to the diagram for monomer, it is concluded that polymer has been prepared. The foregoing is a very sensitive means of analyzing a very small amount of the polymer—which cannot be subjected to conventional techniques used in examining polymers, such as infra-red or chemical analysis, titration, viscosity light scattering, sedimentation and the like procedures. In carrying out the force-area measurement with polymer prepared by film polymerization, the barrier is first withdrawn after the monomeric compound has been reacted to polymer and then recompressed to approximate conditions obtained during measurement of the conventional polymer.

As above noted, in practicing the invention, a water-insoluble monomer is made "fluid" for convenient and rapid distribution over the aqueous medium surface by dissolving the monomer in a substantially water-insoluble organic liquid such as benzene. The solution is then applied to the surface of the aqueous medium upon which it spreads rapidly and polymerization is induced by free radical mechanism.

Suitable monomers which may be utilized include the vinyl esters having alkyl radicals of from 12 to 22 carbon atoms such as vinyl laurate, vinyl palmitate, vinyl oleate, vinyl stearate, and the like, and their mixtures. The polymers are characterized by their bipolar properties, i.e., hydrophilic as well as hydrophobic substituents. The behavior of the bipolar monomer molecules in the sparsely concentrated condition is such that as the molecules are dispersed in the water interface, they array themselves with the non-polar end protruding at a definite angle from the interface. Polymerization of a closely packed array of molecules so disposed produces an oriented monolayer and good likelihood for the formation of a crystalline product. Furthermore, since only a monolayer is involved, there is little likelihood of chain transfer, branching or cross-linking.

The water-insoluble solvents in which the above monomers are dissolved to permit distribution over the aqueous interface are preferably organic oily compounds characterized by the property of readily distributing itself on the aqueous surface, i.e., the intramolecular attraction of the organic compound which serve as suitable solvent must not be so strong as to preclude the spread thereof on an aqueous surface. These solvents should be low boiling, i.e. below 100° C., water-insoluble and inert to vinyl polymerization. Suitable organic solvents which may be utilized are benzene, pentane, petroleum ether, diethyl ether, hexane, cyclohexane, heptane, chloroform, carbon tetachloride, gasoline, and the like, and their mixtures.

As the source of free radicals, any of various catalysts or catalytic conditions known to provide a source of free radicals sufficient to induce polymerization may be utilized. Thus, various forms of high energy radiation or actinic light such as X-ray, gamma-rays and U.V. light, both natural, i.e., from the sun, or artificially produced, may be employed. Illustrative catalytic compounds which may be employed include various peroxides, such as hydrogen peroxide, benzoyl peroxide, alone or in combination with diethyl aniline, acetyl peroxide, tertiary butyl hydroperoxide, ditertiary butyl peroxide, cumene hydroperoxide; tertiary amyl hydroperoxide; various ammonium and alkali metal chlorates and perphosphates, perborates, and the like. Various known redox catalyst systems such as the potassium or ammonium persulfate-potassium metabisulfite or ammonium persulfate-sodium bisulfite systems, for example, may suitably be used.

The temperature at which polymerization takes place may be varied over a fairly wide range, i.e., under ordinary pressures, temperatures as low as 0° C. and as high as 100° C. may be employed, although temperatures close to room temperature, i.e., from about 15° C. to about 30° C. are preferred.

The polymerization times will vary with temperature and concentration of catalyst or dosage of actinic light, or other source for generating free radicals, but generally a reaction time of from about 5 minutes to several hours is adequate. A catalyst concentration generally in the order of 0.05% to about 5% based on the weight of polymerizable compound is sufficient. The catalyst if desired may be dissolved or dispersed in a suitable compatible medium (such as those above-described as solvents for the monomeric compound) and applied to the aqueous surface prior to spreading thereon, the monomer solution to be polymerized. The pH of the reaction may be varied generally although preferably a near neutral pH between about 5 and 8 is preferred.

In view of the micro-thickness of the polymer herein-product, it will be apparent that expansive areas are covered by even a small quantity of the polymer. For example, the area covered by one gram of film on the basis of one molecule thickness is estimated as approximately 6,000 square feet and one pound would cover an estimated area of nearly 2 million square feet.

The polymeric film obtained according to the teachings of the invention may be useful in situ. When prepared for uses other than as a surface film, the polymer may be drawn off or skimmed from the surface upon which it is prepared, and accumulated by any suitable mechanical apparatus.

The invention will be more fully described in connection with the following examples in which parts given are parts by weight unless specifically stated otherwise.

*Example 1*

A sample of vinyl stearate weighing $1 \times 10^{-4}$ grams dissolved in benzene is dropped onto the clear aqueous surface of a Langmuir trough type film-balance 14 cm. wide and 50 cm. long. Compressing the movable barrier to the point 30 cm. from the mica float produces a film pressure of 10 dynes/cm. Then one gram of ammonium persulfate and one-half gram of sodium metabisulfite dissolved in 5 milliliters of water are injected below the film with a syringe. The temperature is 23° C. Polymerization to a monomolecular film ensues and is substantially complete in one hour. In contrast to these mild conditions, much higher temperatures are required for conventional polymerization of vinyl stearate.

*Example 2*

The same procedure of Example 1 is used except that a Hanovia U.V. light, type 74-20, 500 watt, placed one foot over the surface is used to effect polymerization.

The force-area values obtained from a measurement of the polymers of Example 1 (redox initiated polymer) and Example 2 (U.V. initiated polymer) are presented by the curves in the drawing together with the force-area curves obtained by measurement of vinyl stearate monomer and that of polyvinyl stearate derived from a "conventionally" prepared polymer (i.e., polymer prepared by polymerization of vinyl stearate with 0.15% benzoyl peroxide at 80° C. for 24 hours). The results are considered as appropriate evidence that film reacted monomer has polymerized.

*Example 3*

An enameled tray 2' by 3' is cleaned and coated with paraffin. It is then filled to a depth of 3 cm. with deionized water. 36 grams of ammonium persulfate and 10 grams of sodium bisulfite are added. Then 1.3 mg. of vinyl stearate in 6.65 ml. of benzene is slowly dropped onto the surface. An hour later the polymerized film is scraped off with a glass plate in the form of small fibrous pieces.

*Example 4*

The procedure of Example 1 is substantially repeated with the exception that the same amount of vinyl myristate monomer is substituted for the vinyl stearate. A 10 milliliter solution containing 0.5 gram of ammonium persulfate and 0.25 gram of sodium metabisulfite are introduced below the surface. A temperature of 20° C. is maintained. Polymerization is complete in 95 minutes.

*Example 5*

The procedure followed with vinyl myristate in Example 4 is repeated using vinyl palmitate dispersed in heptane in place of benzene and 10 milliliters of a 10% benzoyl peroxide catalyst solution. The temperature is maintained at 35° C. Polymerization is substantially complete in 2 hours.

I claim:
1. A process for the preparation of a polymer of oriented molecular structure which comprises superimposing a horizontal layer of a solution of a polymerizable compound in a substantially water-immiscible organic solvent as a micro-layer substantially one molecule in thickness on the surface of an aqueous medium, closely packing the molecules of said polymerizable compound by compressing the units of the micro-layer laterally so as to form a substantially continuous horizontal film of said compound in a substantially monomolecular thickness and polymerizing said compound by a free radical catalyst, wherein said polymerizable compound is one selected from the group consisting of vinyl esters of fatty acids having from 12 to 22 carbon atoms.
2. The method of claim 1 wherein the polymerizable compound is vinyl stearate.
3. The method of claim 1 wherein the polymerizable compound is vinyl myristate.
4. The method of claim 1 wherein the polymerizable compound is vinyl palmitate.

References Cited in the file of this patent

UNITED STATES PATENTS

| 2,118,864 | Reppe et al. | May 31, 1938 |
| 2,537,970 | Fields | Jan. 16, 1951 |
| 2,562,965 | Swern et al. | Aug. 7, 1951 |
| 2,607,081 | Taylor | Aug. 19, 1952 |

OTHER REFERENCES

Fryling et al.: Industrial and Eng. Chem., vol. 36, No. 2, February 1944, pp. 114–117 (page 117 relied on).

Becher: Emulsions: Theory and Practice, pp. 15–21 (1957), Reinhold Publishing Corporation.

Port et al.: Journal of Polymer Sci., pp. 207–219, vol. 7 (1951).